(12) United States Patent
Schäferling

(10) Patent No.: US 8,342,790 B2
(45) Date of Patent: Jan. 1, 2013

(54) METHOD AND DEVICE FOR STACKING PLATE-SHAPED BODIES

(75) Inventor: Rudolf Schäferling, Bissingen (DE)

(73) Assignee: Grenzebach Maschinenbau GmbH, Ashbach-Baumenheim (DE)

( * ) Notice: Subject to any disclaimer, the term of this patent is extended or adjusted under 35 U.S.C. 154(b) by 424 days.

(21) Appl. No.: 12/665,230

(22) PCT Filed: Jun. 16, 2008

(86) PCT No.: PCT/DE2008/000990
§ 371 (c)(1),
(2), (4) Date: Dec. 17, 2009

(87) PCT Pub. No.: WO2008/154903
PCT Pub. Date: Dec. 24, 2008

(65) Prior Publication Data
US 2010/0189539 A1    Jul. 29, 2010

(30) Foreign Application Priority Data
Jun. 20, 2007  (DE) .......................... 10 2007 028 418

(51) Int. Cl.
*B65G 57/06* (2006.01)
*B65G 57/02* (2006.01)
*B65G 47/82* (2006.01)

(52) U.S. Cl. .................................................. 414/794.3

(58) Field of Classification Search .................. 271/213, 271/214, 218; 414/746.6, 746.8, 788.9, 789.3, 414/789.5, 790.3, 791.6, 792.1, 792.6, 792.7, 414/792.8, 793.4, 793.9, 794, 794.4–794.3, 414/794.7, 799

See application file for complete search history.

(56) References Cited

U.S. PATENT DOCUMENTS 3,130,839 A * 4/1964 Grasvoll .................... 414/793.8
4,195,959 A * 4/1980 Schmitt ...................... 414/788.9

(Continued)

FOREIGN PATENT DOCUMENTS

DE              49133        10/1889
(Continued)

OTHER PUBLICATIONS

English Translation of the Notice of Preliminary Rejection issued in corresponding Korean Patent Application No. 2009-7026511.

(Continued)

*Primary Examiner* — Gregory Adams
(74) *Attorney, Agent, or Firm* — Duane Morris LLP; J. Rodman Steele, Jr.; Gregory M. Lefkowitz

(57) ABSTRACT

The invention relates to a device for stacking plate-shaped bodies, comprising the following features: a) a plate-shaped body (2) is conveyed by a conveying device (3) to the region of the push comb (7); b) the push comb (7) pushes the plate-shaped body (2) onto a surface that consists of the front tablet comb (6) and the rear tablet comb (5); c) the retaining comb (8) prevents a return movement of the plate-shaped body when the front tablet comb (6) and the rear tablet comb (5) move apart from one another and controls the falling motion of the plate-shaped body (2) onto the plate stack. The invention also relates to an associated method and a machine-readable support provided with the program code for carrying out said method.

9 Claims, 10 Drawing Sheets

U.S. PATENT DOCUMENTS

| | | | | |
|---|---|---|---|---|
| 4,274,781 A | * | 6/1981 | Rysti | 414/794.1 |
| 4,302,140 A | * | 11/1981 | Donnelly et al. | 414/790.3 |
| 4,623,291 A | * | 11/1986 | Buck | 414/788.3 |
| 4,704,060 A | * | 11/1987 | Winski et al. | 414/792.6 |
| 5,354,047 A | * | 10/1994 | Chesnutt et al. | 271/195 |
| 6,048,164 A | * | 4/2000 | Ritola | 414/789.5 |
| 6,701,064 B1 | | 3/2004 | De Haan et al. | |
| 6,866,469 B2 | * | 3/2005 | Harris et al. | 414/793.4 |
| 2003/0146559 A1 | * | 8/2003 | Middelberg et al. | 271/9.01 |
| 2006/0045723 A1 | * | 3/2006 | Hogue et al. | 414/789.5 |

FOREIGN PATENT DOCUMENTS

| | | |
|---|---|---|
| DE | 2904252 | 8/1979 |
| DE | 3736759 | 5/1989 |
| DE | 4213352 | 10/1993 |
| DE | 4412830 | 10/1995 |
| DE | 19932905 | 1/2001 |
| DE | 102007028418 | 6/2008 |
| EP | 0032367 | 7/1981 |
| EP | 0359920 | 3/1990 |
| EP | 0487837 | 2/1992 |
| EP | 1155998 | 11/2001 |
| GB | 1 211 546 | 11/1970 |
| JP | 61094927 | 5/1986 |
| JP | 61094927 A * | 5/1986 |
| JP | 61-206728 A | 9/1986 |
| JP | 8299915 A | 11/1996 |
| JP | 09-278186 A | 10/1997 |
| SU | 1491786 A1 | 7/1989 |
| SU | 1551582 A1 | 3/1990 |
| UA | 11802 U | 1/2006 |

OTHER PUBLICATIONS

Japanese Patent Office; "Notice of Reasons for Rejection" mailed on Jul. 3, 2012, on parallel Japanese Patent Application No. 2010-512509; pp. 1-5.

* cited by examiner

METHOD AND DEVICE FOR STACKING PLATE-SHAPED BODIES

CROSS-REFERENCE TO RELATED APPLICATIONS

This application is a §371 national stage entry of International Application No. PCT/DE2008/000990, filed Jun. 16, 2008, which claims priority to German Patent Application No. 10 2007 028 418.9, filed Jun. 20, 2007, both of which are hereby incorporated by reference.

FIELD OF THE INVENTION

The invention relates to a method and a device for stacking insulating materials in sheet form comprising mineral fibers, in particular comprising rock and/or mineral fibers, in which a number of sheets of insulating material are arranged with their large surfaces lying one against the other, the surfaces of the sheets of insulating material being aligned vertically in the stack.

SUMMARY OF THE INVENTION

Insulating materials comprising mineral wool consist of vitreously solidified mineral fibers which are joined together in principle at discrete points by small amounts of a binder, usually a thermosetting plastic. The mineral fibers are obtained from a melt which is fiberized in a fiberizing unit. In the production of such insulating materials, the fractions of organic substance should be minimized in order as far as possible to achieve classification as a construction material that is "noncombustible to DIN 4101, Part 1". On the other hand, an elastic and at the same time resilient behavior of the individual mineral fibers within the insulating material should be retained. The lower limit of the binder contents is determined by the retention of the material properties required for use and handling, such as for example the compressive strength and tensile strength. To hydrophobize the fiber mass, impregnating agents are also added in amounts of about 0.1 to about 0.4 percent as a proportion of the mass. It is common commercial practice to distinguish between insulating materials comprising glass wool and rock wool. Glass wool fibers are produced from silicate melts with relatively high alkali content, optionally also boroxides, by passing the melt through the fine openings in the wall of a rotating body. This creates relatively long and smooth mineral fibers, which are provided with binders and impregnating agents and fall onto an air-permeable transporting belt. The specific output of such a fiberizing unit is low, at several hundred kilograms of mineral fibers per hour. Therefore, a number of units together with the associated dropping shafts are arranged one behind the other over a production line. An endless fiber web drawn off from the fiberizing units is transported away at a greater or lesser speed, depending on the desired thickness and apparent density. The curing of the binder fixing the structure of the insulating material to be produced takes place in a curing oven, in which hot air is passed through the fibrous web. Subsequently, the cured fibrous web is trimmed at the sides and, for example, divided in the middle into two webs, from which sheets of insulating material of a certain length and any desired widths, within the limits of the width of the web, can be separated with hardly any loss.

Insulating materials comprising rock fibers, in particular sheets of insulating material comprising rock fibers, are less readily compressible than insulating materials comprising glass fibers, since they have distinctly different structures, which are evident primarily in the tangled form of the short rock fibers, the rock fibers already aggregating into flocks on the way from the fiberizing machine to a transporting belt. On account of this behavior, relatively high compressive values and transverse tensile values are achieved in spite of the approximately 30 to 59% lower amounts of binder in comparison with insulating materials comprising glass fibers.

Since the very efficient fiberizing units for the fiberizing of a melt of silicate rock provide a high material throughput, it is necessary for the mineral fibers mixed with binders and impregnating agents to be transported away very quickly in the form of a fibrous web because of their rapid cooling. This takes place in the form of a so-called primary nonwoven, which is as thin as possible and is laid by means of a rocking device while kept as flat as possible transversely onto a second, slowly running, transporting device. The upward rocking of the thin primary nonwoven compensates for inhomogeneities within the primary nonwoven, and consequently in the endless fibrous web built up from it. The insulating materials produced from this have, for example, very narrow variations in apparent density over the width of the production line and the height of the fibrous web.

Sheets of insulating material comprising rock fibers are produced with customary dimensions of 1 m or 1.2 m in length along with a width of 0.6 m or 0.625 m and thicknesses of about 20 mm to about 240 mm.

Sheets of insulating material are produced in large quantities and therefore, after formatting, must be ordered in stacks, packed and shipped.

DE 37 36 759 A1 discloses a sheet stacker with a frame, in which transporting means for sheets are arranged, the sheets being transported from a machine outlet to a cassette, in which they are stacked.

Claimed as patentable in claim 1 of this document is that a swivel fork is mounted in side parts of the frame on the side of the frame that is facing the cassette, that the swivel fork can be swiveled through an angle of up to 120° from the horizontal position into an upright position and can be swiveled back again, and that a double-acting pneumatic cylinder moves a toothed rack back and forth, with which a spur wheel meshes on a shaft of the swivel fork.

With this known sheet stacker, however, it is only possible for individual sheets that are transported horizontally to it to be stacked on edge in a cassette. Keeping the sheets horizontally, without introducing them into a cassette, and consequently unrestricted further processing, is not possible with the sheet stacker known from DE 37 36 759 A1.

EP 1 155 998 A1 discloses a method for stacking sheets, in particular sheets that are sensitive to impact or bending, by means of a sheet stacker, which comprises a conveyor, which conveys the sheets up to it substantially in the direction of their two-dimensional extent, and a stacking table, which adjoins said conveyor and the height of which is adjusted as stacking progresses so as to provide a small difference in height between the conveyor and the upper side of the stack.

According to the characterizing part of claim 1, it is considered here to be essential to the invention that the sheets are allowed to slide onto the upper side of the stack while they are still supported by the conveyor.

The difference in height between the upper side of the stack and the end of the conveyor, measured perpendicularly to the conveying direction, is intended here to be less than one twentieth of the smaller two-dimensional extent (width or length) of the sheets.

The device for carrying out the method is distinguished by the fact that two stacking tables are arranged one behind the other in the direction of the conveyor and can be alternately connected to the conveyor, the conveyor being formed by one or more arranged tongues and the stacking table that is closer to the conveyor being formed by one or more supports that are arranged offset in relation to the tongues of the conveyor.

This ensures that, for the operation of changing over the conveyor belt from the front stacking table (5) to the rear stacking table (4), at the point in time at which the last sheet that is to be laid on the stack of the front stacking table (5) has left the conveyor belt, the following sheet is already over the stack of the rear stacking table (4). Although this means that there is a time saving in comparison with the known methods of the prior art, it is still always necessarily here to use two stacking tables alternately. This measure means that further processing or further conveyance is made more difficult, in terms of the time taken and in terms of technical considerations.

The present invention therefore addresses the problem of providing a device and a method for horizontally stacking sheets of large area, in particular comprising minerals, which make it possible to accomplish the stacking operation quickly, reliably and without an additional depositing surface.

This problem is solved by the device according to claim 1 and the method according to claim 8.

This solution primarily comprises conveying the sheets by means of special conveying elements on the basis of a special organizational plan in such a way that the time involved is minimized.

The features according to the invention are described in more detail below.

BRIEF DESCRIPTION OF THE DRAWINGS

The figures specifically show.

DETAILED DESCRIPTION

Figure 1:
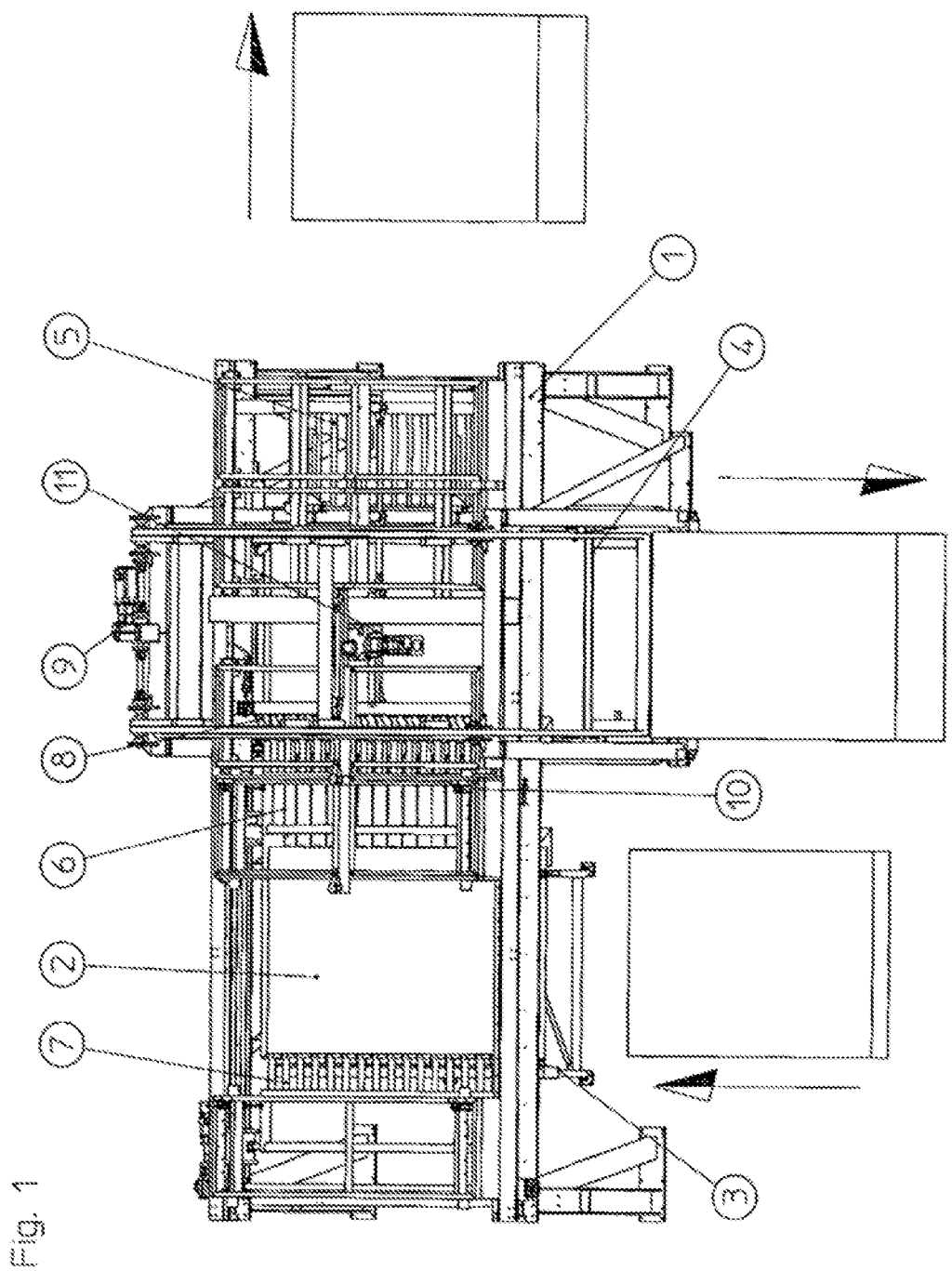
FIG. 1: a 3D drawing of the device

In FIG. 1, the basic frame (1) with its stand structure can be seen from the perspective of a viewer at eye level. Shown on the left side of this basic frame is a mineral wool sheet (2), which has been conveyed to the point shown by a feeding means, for example a conveyor belt or the roller conveyor (3). In the foreground, a mineral wool sheet (2) is sketched in the direction indicated by the associated arrow. At this point it is monitored by a camera system that is not shown to ascertain whether the sheet concerned is damaged or can be fed to the following stacking process. This is possible, for example, by means of automatically monitoring the clear profile, within certain tolerances, in the case of a satisfactory sheet. The concept of a "clear profile" is one that is presented to any car driver driving down a tree-lined street. Since the device according to the invention is not only suitable for mineral wool sheets (2), other criteria for the material to be stacked may also be checked at this point. If it is necessary in the case of certain types of sheets for a certain weight to be maintained in the production process, this is likewise automatically monitored at the point concerned. Should it be decided that a sheet (2) must be rejected, the sheet is automatically discarded by a device that is not shown here.

In the right part of FIG. 1, the actual sheet stacker is represented in the form of the frame structure shown, with the associated belt conveyor (4) for the finished stacks of sheets.

Figure 2:
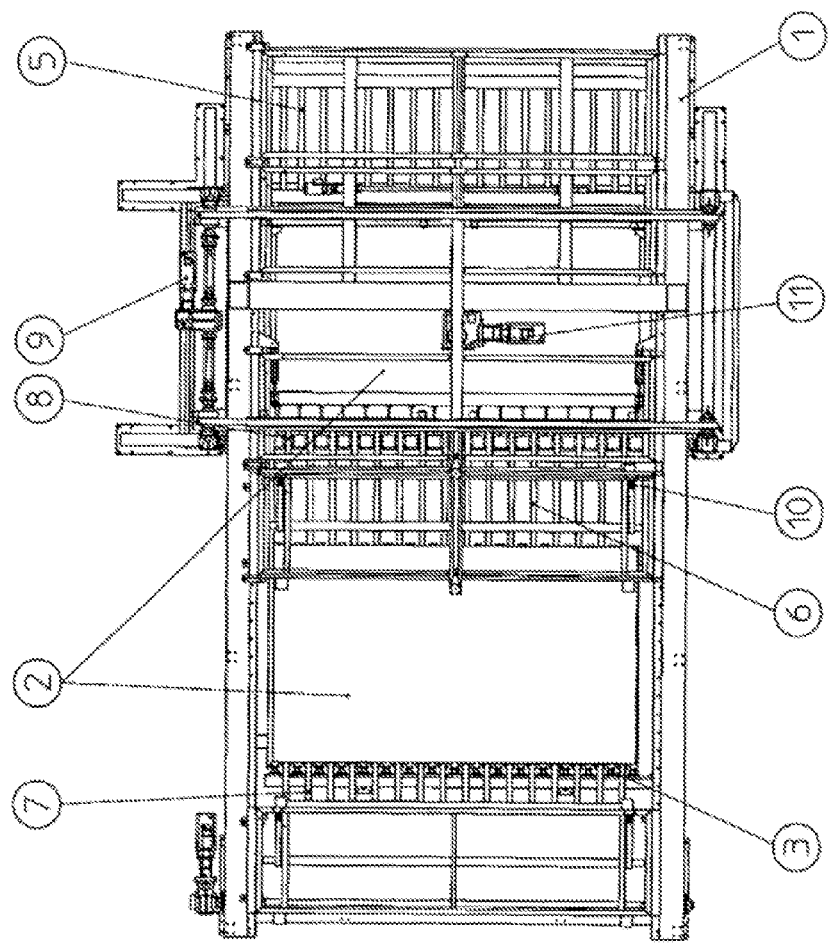
FIG. 2: a detailed plan view of the device

In FIG. 2, the system from FIG. 1 is shown as seen from perpendicularly above. On the left side, a mineral wool sheet (2) can once again be seen, here in the true side-on position, and is conveyed to the right by the pushing comb (7) on the front tablet comb (6).

The retaining comb (8) cannot be seen very clearly of course in this representation from above.

On the right side, the rear tablet comb (5) is represented from above.

The associated drive (9) for the entire tablet can be seen above the actual stacking device.

The drive for the retaining comb (8) is denoted by the number (10) and the drive for the front tablet comb (6) and the rear tablet comb (5) bears the number (11).

Figure 3:
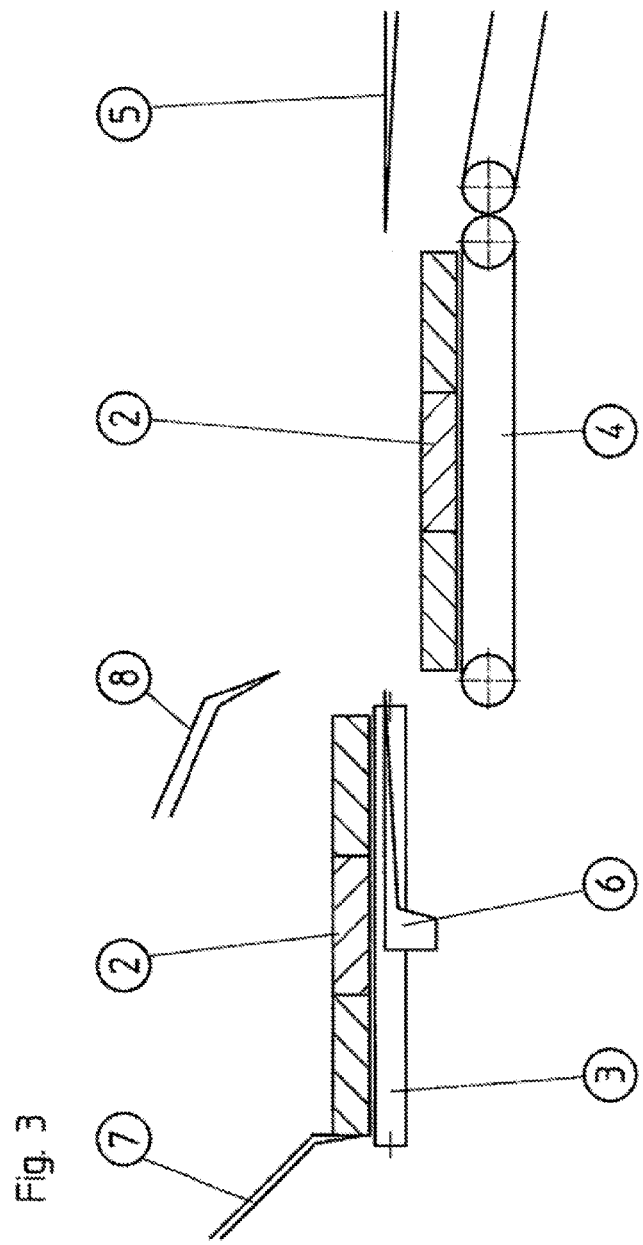
FIG. 3: a schematic representation of the functional elements

FIG. 3 shows the schematic representation of the individual functional elements in cross section. The pushing comb (7) here pushes a mineral wool sheet (2) onto the front tablet comb (6); the retaining comb (8) is in its starting position and a further mineral wool sheet (2) lies on the belt conveyor for the stack of sheets, which comes into action when a stack reaches the desired height.

The following figures show detailed intermediate steps in the procedure of the overall stacking operation.

Figure 4:
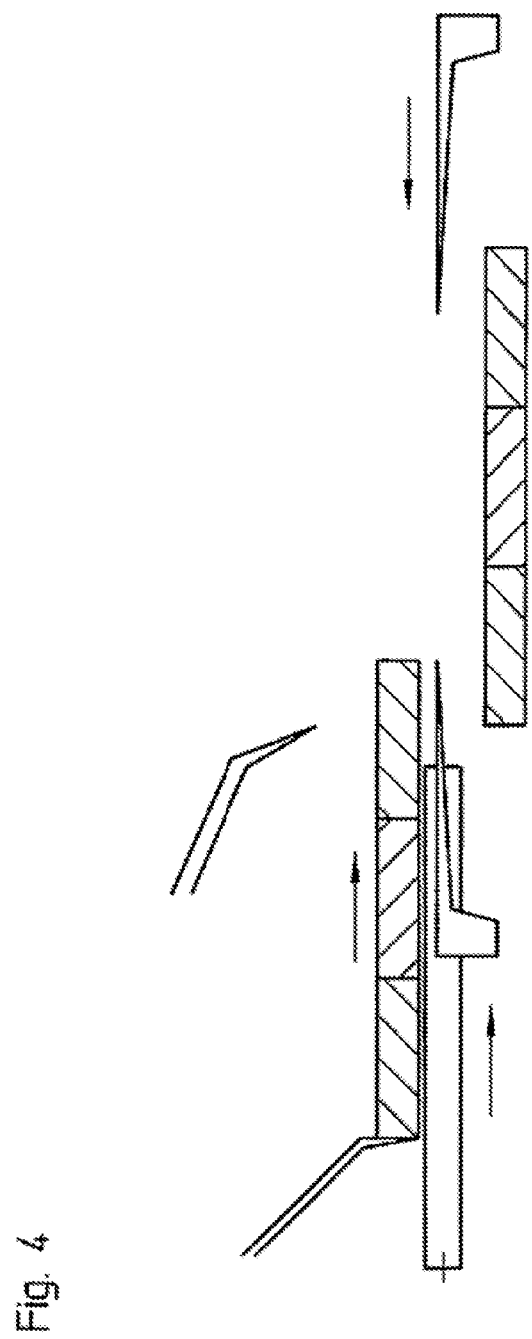
FIG. 4: a first detail of the functional sequence

For instance, in FIG. 4 it can be seen how the pushing comb (7) pushes a mineral wool sheet (2) onto the front tablet comb (6), which together with the rear tablet comb closes the tablet, while the retaining comb (8) is in the waiting position. A mineral wool sheet (2) is already lying on the belt conveyor (4) for the stack of sheets.

Figure 5:
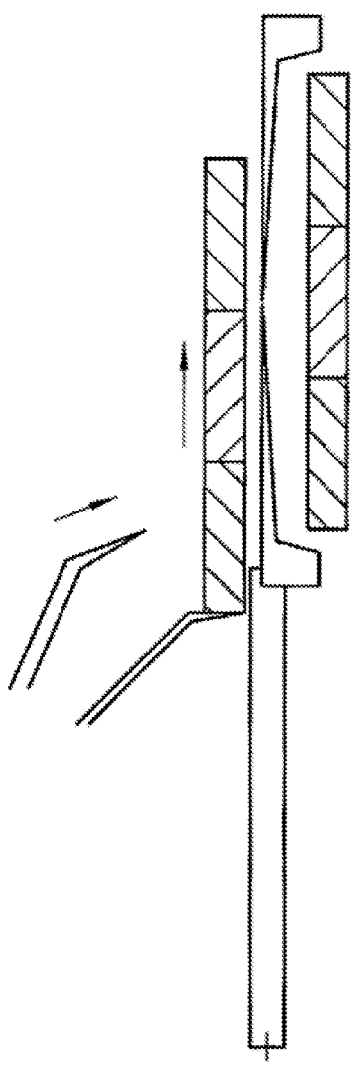
FIG. 5: a second detail of the functional sequence

In FIG. 5, the mineral sheet (2) concerned has already been pushed by the pushing comb (7) a little further onto the closed tablet that is created by the rear tablet comb (5) and the front tablet comb (6) in the closed position on both sides. The retaining comb (8) is in the process of preventing the sheet from sliding back when the front tablet comb (6) begins to move counter to the direction from which the sheet (2) has come, because the sheet (2) has reached its end position. The commencing downward movement of the retaining comb (8) from the starting position is sketched in the upper part of the figure.

Figure 6:
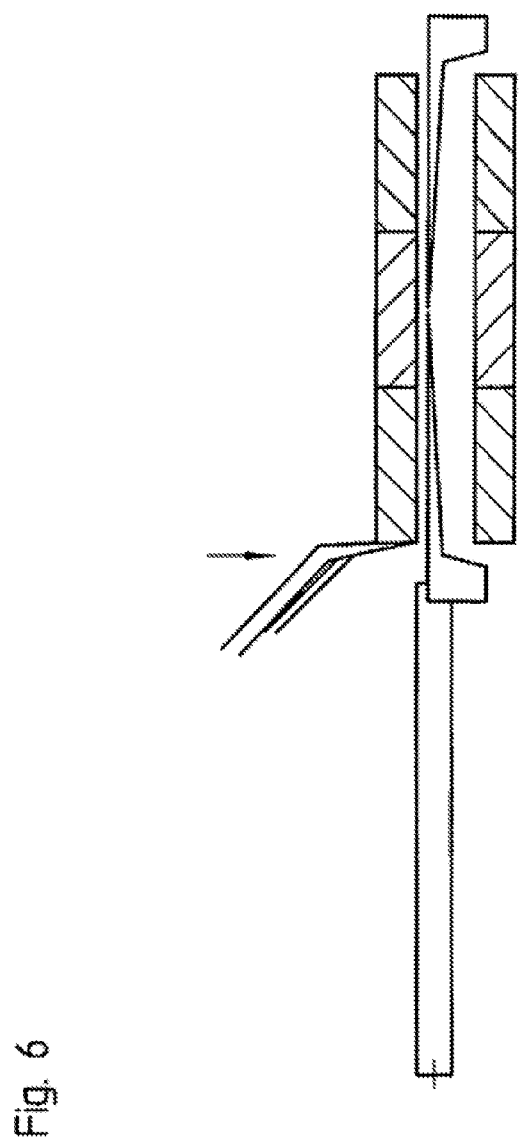
FIG. 6: a third detail of the functional sequence

Represented in FIG. 6 is the point in time at which the pushing comb (7) has completed its journey and the retaining comb (8) has lowered itself from above into the intermediate spaces which the pushing comb (7) has left free. This is necessary since the operations described proceed very quickly and the required rapid time sequence could not be realized without this interengaging of the comb-like structures concerned.

Figure 7:
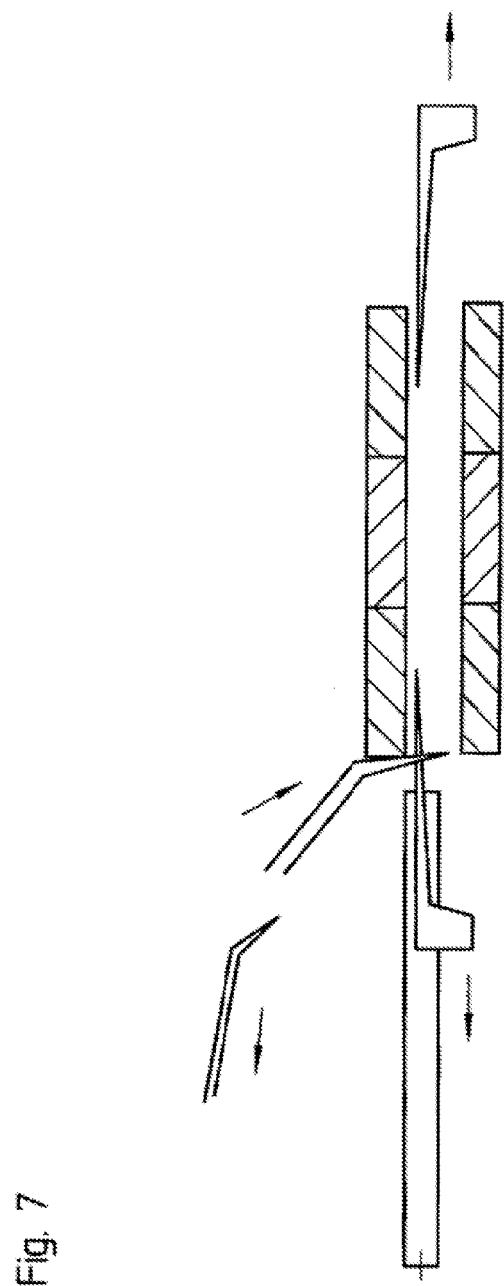
FIG. 7: a fourth detail of the functional sequence

In FIG. 7, it can be seen how the front tablet comb (6) and the rear tablet comb (5) move apart in order to clear the space for the sliding through of the sheet (2). The retaining comb (8) has continued its downward movement and ensures with this movement that the sheet (2) concerned slides to precisely the right point on the stack that is already present. It must be remembered here that the corresponding figures show sectional drawings and the edge shown of the retaining comb (8) corresponds in practice to a surface area with which the respective sheet is aligned.

Figure 8:
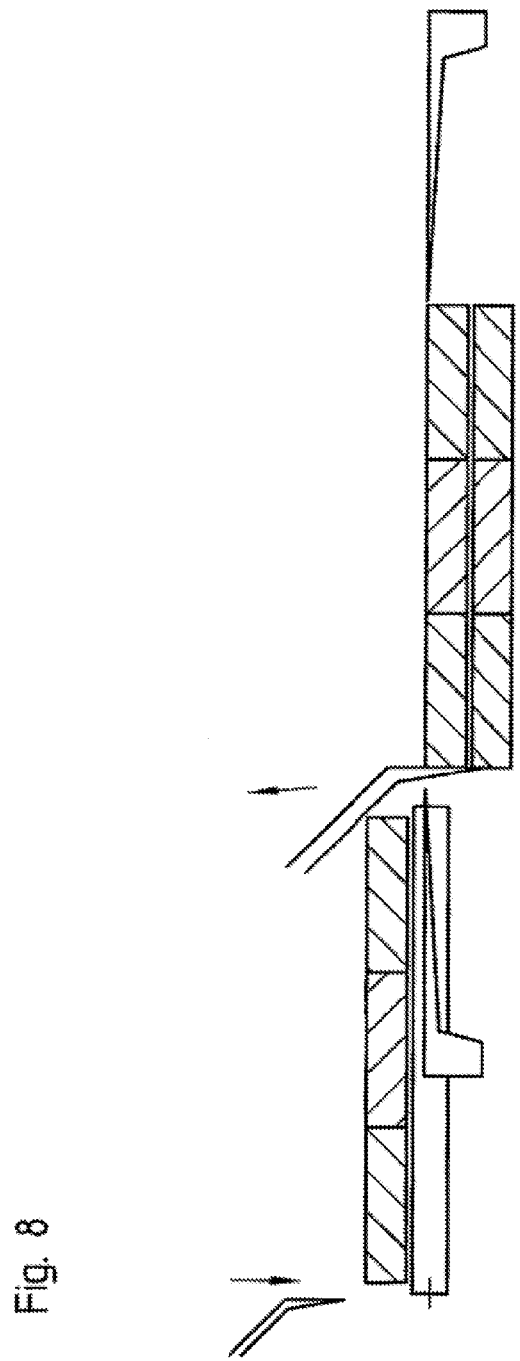
FIG. 8: a fifth detail of the functional sequence

In FIG. 8, the sheet (2) concerned has been deposited on the previous sheet (2), the stack has lowered itself in accordance with the thickness of the sheets to be stacked and the pushing comb (7) is already beginning to approach the next sheet (2) from the left. The retaining comb (8) is already in an upward movement again.

Figure 9:
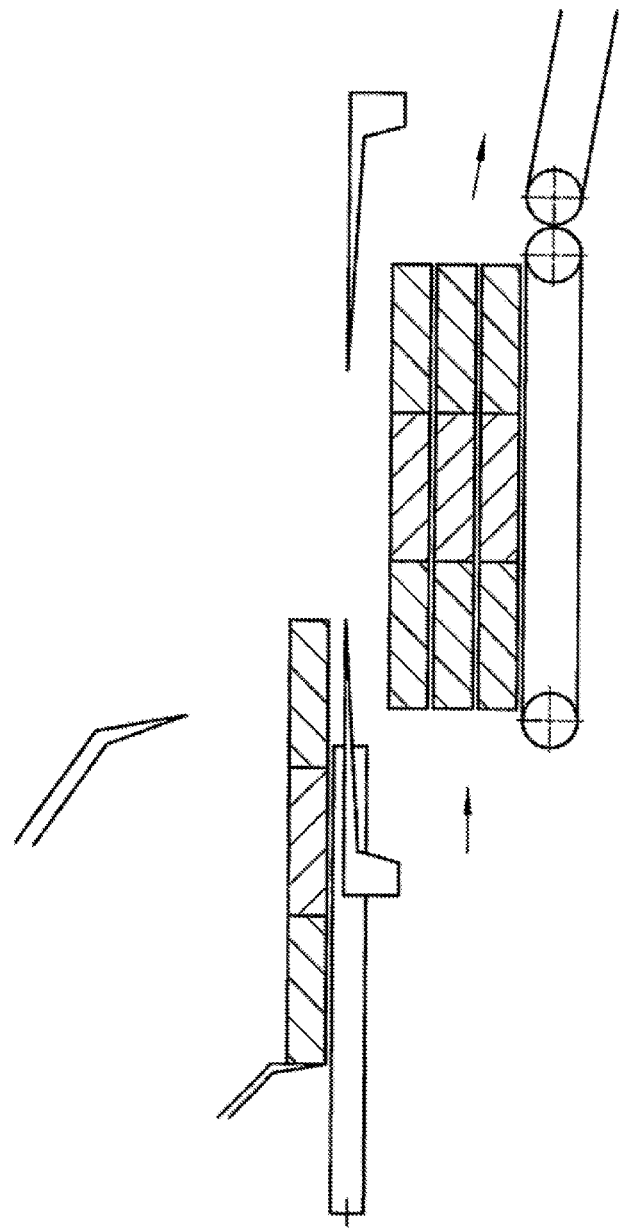
FIG. 9: a sixth detail of the functional sequence
Figure 10:
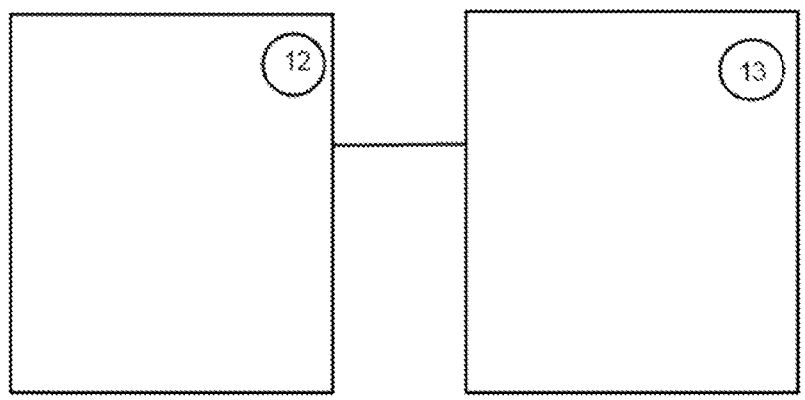
FIG. 10: a schematic diagram of a machine-readable carrier and a computer described herein.

The representation in FIG. 9 corresponds to the representation in FIG. 4, apart from the height of the stack of sheets.

Since the sequences of movements described proceed at high speed, the control elements that move the respective sheets (2) are subjected to high forces of acceleration. Moreover, they must be at certain locations precisely at certain recurring times. This means that these control elements, like the rear and front tablet combs (6, 5), the pushing comb (7) and the retaining comb (8), must be produced from a material that is lightweight but nevertheless very stable. Glass-fiber-reinforced plastic comes into consideration here in particular.

Modern servomotors (e.g. 9, 10, 11) with the corresponding control programs are available for the exact execution of the functional sequences described.

To detect the respective position of the control elements concerned, the sensors known to a person skilled in the art for the respective application are used.

The conception for devising a computer program ensuring this functional sequence can likewise be adapted by a person skilled in the art to the respective local conditions on the basis of the operations described.

For example, a computer program can include a program code for carrying out the method steps described herein when the program is executed in a computer. A machine-readable carrier 12 can also include the program code of a computer program for carrying out the method as described herein when the program is executed in a computer 13.

LIST OF DESIGNATIONS (1) basic frame
(2) body in sheet form, mineral wool sheets
(3) roller conveyor of the production line
(4) belt conveyor for stack of sheets
(5) rear tablet comb
(6) front tablet comb
(7) pushing comb
(8) retaining comb
(9) tablet drive
(10) drive for retaining comb
(11) drive for tablet combs (rear, front)
(12) machine-readable carrier
(13) computer

The invention claimed is:

1. A device for stacking bodies in sheet form comprising the following features:
   a) a conveying device (3) respectively conveys a body in sheet form (2) into the region of a pushing comb (7),
   b) the pushing comb (7) pushes the body in sheet form (2) onto a surface area which comprises a front tablet comb (6) and a rear tablet comb (5),
   c) a retaining comb (8) actuates downward in a vertical direction from a starting position above said surface area, prevents a returning movement of the body in sheet form (2) when the front tablet comb (6) and the rear tablet comb (5) move apart and controls the falling movement of the body in sheet form (2) onto the stack of sheets and wherein the pushing comb (7) and the retaining comb (8) engage within and through one another.

2. The device as claimed in claim 1, wherein guiding elements that are necessary for the operating sequence and have to be accelerated consist of a material which is lightweight and at the same time flexurally resistant.

3. The device as claimed in claim 1, wherein the required movements are performed by servomotors.

4. The device as claimed in claim 1, wherein an admissible time tolerance is determined for each controlling operation, the maintenance thereof is monitored and, if a tolerance limit is exceeded, an alarm is set off.

5. A method for stacking bodies in sheet form comprising the following method steps:
   providing a device as claimed in claim 1;
   conveying the body in sheet form (2) by means of the conveying device (3) to a stacking device comprising the pushing comb (7), retaining comb (8) and the surface area (5,6);
   pushing the body in sheet form (2) in the direction of the separable surface area (5, 6);
   moving the front tablet comb (6) of the separable surface area counter to the conveying direction of the body in sheet form (2), while at the same time preventing the body in sheet form (2) from following this movement with the retaining comb (8);
   moving the rear tablet comb (5) of the separable surface area in the opposite direction from that of the front tablet comb (6), while moving the retaining comb (8) downward in the vertical direction; and
   releasing the body in sheet form (2) from the separable surface area (5, 6), wherein the body follows gravitational force and falls into a collecting position.

6. A computer program with a program code for carrying out the method steps as claimed in claim 5 when the program is executed in a computer.

7. A machine-readable carrier with the program code of a computer program for carrying out the method as claimed in claim 5 when the program is executed in a computer.

8. The method as claimed in claim 5, further comprising: monitoring each body in sheet form for damaged bodies and automatically discarding the damaged bodies prior to the stacking process.

9. The device as claimed in claim 1, wherein the retaining comb (8) actuates downward in a vertical direction when said pushing comb (7) moves counter to a conveying direction of the body.

* * * * *